Patented Sept. 12, 1950

2,522,163

UNITED STATES PATENT OFFICE 2,522,163

PROCESS OF MANUFACTURING
PYRIDINECARBOXYLIC ACIDS

Francis E. Cislak and William R. Wheeler, Indianapolis, Ind., assignors to Reilly Tar & Chemical Corporation, Indianapolis, Ind., a corporation of Indiana No Drawing. Application March 25, 1942,
Serial No. 436,168

21 Claims. (Cl. 260—295.5)

Our invention relates to a process of manufacturing pyridinecarboxylic acids by the oxidation of sulfates of such pyridine-ring-containing compounds as alkyl pyridines, quinoline, isoquinoline, and alkyl quinolines.

Heretofore pyridinecarboxylic acids have been prepared by the oxidation of alkyl pyridines, quinoline, isoquinoline, or alkyl quinolines with potassium permanganate. The preparation of pyridinecarboxylic acids in this manner is costly and troublesome; moreover, the potassium permanganate is not only an expensive oxidizing agent, but it is not now available except for essential war uses.

We have invented a process of producing pyridinecarboxylic acids from sulfates of alkyl pyridines, quinoline, isoquinoline, and alkyl quinolines which utilizes nitric acid as the oxidizing agent. Nitric acid is a readily available and inexpensive oxidizing agent which can easily be separated from the desired oxidation products; furthermore, the resulting nitric oxides can be reconverted into nitric acid merely by absorption in aerated water. Heretofore there has been no known method of utilizing nitric acid for the oxidation of the above-mentioned pyridine-ring-containing compounds.

Fundamentally, our process consists in oxidizing the sulfates of the said pyridine-ring-containing compounds with nitric acid at elevated temperatures, with or without oxidation catalysts; if desired, with subsequent elimination of sulfuric acid.

The preferred manner in which our invention may be practiced is described more specifically, and the variation permitted in detail is illustrated, in the following examples.

*Example 1.*—In a one-liter flask, form a solution of 47 grams of 96% 3-picoline, 50 cc. of concentrated sulfuric acid (96%), and 25 cc. of concentrated nitric acid (70%). Reflux this solution for about 2–3 hours; and then distill off the water formed by the oxidation (as well as the water initially added with the nitric acid), and with it any remaining nitric acid. It is desirable to stop the distillation when the temperature of the liquid remaining in the flask reaches about 200° C.

Now cool the contents of the flask to about 120° C., and repeat the nitric-acid oxidation. To this end, add about 25 cc. more concentrated nitric acid. Reflux the solution for about 2–3 hours. Distill off the water, and the remaining nitric acid.

Repeat the procedure of the immediately preceding paragraph until a total of about 275 cc. of the concentrated nitric acid has been put through. When the last distillation has been completed, remove any remaining traces of nitric acid from the residue in the flask by aerating the hot solution.

Then cool the said residue and dilute it with about 700 cc. of water.

If it is desired to eliminate sulfuric acid, add the calculated amount (about 180 grams) of barium carbonate to the resulting aqueous solution, to precipitate the sulfuric acid in the form of barium sulfate. Separate the barium sulfate from the mother liquor, as by filtration. The mother liquor now contains 3-pyridinecarboxylic acid—which is nicotinic acid.

Concentrate the clear mother liquor, as by evaporation or distillation, to cause the nicotinic acid to crystallize. Separate and purify the crystalline nicotinic acid in known manner.

*Example 2.*—In place of intermittently adding small portions of nitric acid to the 3-picoline sulfate, refluxing, and distilling, as in Example 1, we can continuously pass vaporized nitric acid through the hot 3-picoline sulfate and continuously distill off the water and excess nitric acid. The entering nitric-acid vapor may be mixed with oxygen or air; in which case the amount of nitric acid required is diminished.

In a one-liter flask form a solution of 47 grams of 93% 3-picoline and 92 grams of 96% sulfuric acid. Heat this solution to a temperature of about 150–250° C., preferably about 170° C., and maintain it at this temperature. Slowly (over a period of 15 to 25 hours) vaporize 300 cc. of 70% nitric acid and pass it into the picoline-sulfate solution; condense the water, the unreacted nitric acid, and the nitric oxides evolved. After all the vaporized nitric acid has been passed into the picoline-sulfate solution, aerate the hot solution to remove residual traces of nitric acid.

Cool and dilute the picoline-sulfate solution, and if desired separate the nicotinic acid, as in Example 1.

*Example 3.*—In place of the 3-picoline of Examples 1 and 2, we can use any of the other alkyl pyridines, such as 2-picoline, 4-picoline, 2,6-lutidine, 2-ethyl pyridine, etc., to obtain corresponding pyridinecarboxylic acids.

*Example 4.*—In place of the 3-picoline of Examples 1 and 2, we can use quinoline or isoquinoline, to obtain pyridinedicarboxylic acids, or we can use alkyl quinolines to obtain pyridinedicarboxylic acids or alkyl pyridinedicarboxylic acids.

For instance, a solution of 64.5 g. of quinoline and 110 g. of 96% sulfuric acid is placed in any suitable vessel for bringing about intimate contact of gas and liquid, and heated to 150–230° C., preferably about 180° C.; and the vapor of 500 to 800 cc. of nitric acid (70%) is passed through over a period of 24–48 hours. The reaction mixture is cooled, and diluted with water; whereupon any small amounts of by-product nitroquinolines precipitate and are filtered off. The filtrate is made alkaline, and more by-product nitro-compounds are precipitated and removed by filtration. The remaining alkaline solution contains a salt of quinolinic acid. On acidifying this alkaline solution with acetic acid, and treating with a solution of copper sulfate, green copper quinolinate is precipitated. From this copper salt quinolinic acid may be prepared by saturating its aqueous suspension with hydrogen sulfide, filtering off the precipitated copper sulfide, and evaporating the filtrate until quinolinic acid separates.

If desired, we can use oxidation catalysts, such as vanadium or manganese salts, in any of those Examples 1 to 4, with beneficial results; but those catalysts are not necessary.

We claim as our invention:

1. The method of producing a pyridinecarboxylic acid, which comprises oxidizing a sulfate of a pyridine-ring-containing compound of the class consisting of alkyl pyridines, quinoline, isoquinoline, and alkyl quinolines, with nitric acid at an elevated temperature sufficiently high to vaporize nitric acid and recovering the pyridinecarboxylic acid.

2. The method of producing a pyridinecarboxylic acid as described in claim 1, in which the pyridine-ring-containing compound is 3-picoline.

3. The method of producing a pyridinecarboxylic acid as described in claim 1, in which the pyridine-ring-containing compound is quinoline.

4. The method of producing a pyridinecarboxylic acid as described in claim 1, in which the pyridine-ring-containing compound is 2-picoline.

5. The method of producing a pyridinecarboxylic acid as described in claim 1, in which the pyridine-ring-containing compound is 4-picoline.

6. The method of producing a pyridinecarboxylic acid as described in claim 1, in which the pyridine-ring-containing compound is an alkyl quinoline.

7. The method of producing a pyridinecarboxylic acid as described in claim 1, with the addition of the step of eliminating sulfuric acid.

8. The method of producing a pyridinecarboxylic acid, which comprises treating a pyridine-ring-containing compound of the class consisting of alkyl pyridines, quinoline, isoquinoline, and alkyl quinolines, with sulfuric acid and nitric acid at an elevated temperature sufficiently high to vaporize nitric acid and recovering the pyridinecarboxylic acid.

9. The method of producing a pyridinecarboxylic acid as described in claim 8, in which the pyridine-ring-containing compound is 3-picoline.

10. The method of producing a pyridinecarboxylic acid as described in claim 8, in which the pyridine-ring-containing compound is quinoline.

11. The method of producing a pyridinecarboxylic acid as described in claim 8, in which the pyridine-ring-containing compound is 2-picoline.

12. The method of producing a pyridinecarboxylic acid as described in claim 8, in which the pyridine-ring-containing compound is 4-picoline.

13. The method of producing a pyridinecarboxylic acid as described in claim 6, with the addition of the step of eliminating sulfuric acid.

14. The method of producing a pyridinecarboxylic acid which comprises oxidizing a sulfate of alkyl pyridine with nitric acid at elevated temperatures and recovering the pyridinecarboxylic acid.

15. The method of producing pyridinecarboxylic acids which comprises oxidizing a sulfate of the following compounds

where R is alkyl and

the pyridine ring, with nitric acid at elevated temperatures and recovering a pyridinecarboxylic acid.

16. In the catalytic oxidation to a pyridinecarboxylic acid of an N-heteroaryl compound containing an oxidizable organic grouping attached to the nitrogen-containing aromatic nucleus by one or more carbon-to-carbon linkages, the improvement which comprises conducting the oxidation by reacting nitric acid with the N-heteroaryl compound in the presence of a relatively small amount of the catalyst and sulfuric acid.

17. The process which comprises mixing sulfuric acid and a compound of the class consisting of alkyl pyridines and compounds having the structure

where R is selected from the group consisting of hydrogen and alkyl and N is the pyridine ring, and reacting the resultant mixture with nitric acid at elevated temperatures and recovering the so formed pyridinecarboxylic acid.

18. The process which comprises mixing sulfuric acid and quinoline, reacting the resultant mixture with nitric acid at elevated temperatures and recovering the so formed nicotinic acid.

19. In the catalytic oxidation to a pyridinecarboxylic acid of an N-heteroaryl compound containing an oxidizable organic grouping attached to the nitrogen-containing aromatic nucleus by one or more carbon-to-carbon linkages, the improvement which comprises conducting the oxidation by adding nitric acid to a solution containing the N-heteroaryl compound and a relatively small amount of the catalyst dissolved in sulfuric acid.

20. In the catalytic oxidation to a pyridinecarboxylic acid of an N-heteroaryl compound containing an oxidizable organic grouping attached to the nitrogen-containing aromatic nucleus by one or more carbon-to-carbon linkages, the improvement which comprises conducting the oxidation by reacting nitric acid with a sulfuric acid solution of the N-heteroaryl compound in the presence of a catalyst.

21. The method of producing a pyridinecarboxylic acid as described in claim 8, in which the pyridine-ring-containing compound is an alkyl quinoline.

FRANCIS E. CISLAK.
WILLIAM R. WHEELER.

REFERENCES CITED

The following references are of record in the file of this patent:

Maier, "Das Pyridine und Seiner Derivatives," 1934, pages 212, 222, 230, 237, 241, 248, 249, 251, 264.